United States Patent [19]

Smits et al.

[11] Patent Number: 5,001,164

[45] Date of Patent: Mar. 19, 1991

[54] POLYURETHANE FOAM PREPARED WITH REDUCED LEVELS OF HARD HALOCARBON BLOWING AGENTS

[75] Inventors: Guido F. Smits, Wijnegem, Belgium; Johan A. Thoen, Dommelstraat, Netherlands; Robert M. Davidson, Midland, Mich.; Llewellyn D. Booth, deceased, late of Lake Jackson, Tex., by Patricia K. Booth, Administratix

[73] Assignee: The Dow Chemical Company, Midland, Mich.

[21] Appl. No.: 234,459

[22] Filed: Aug. 19, 1988

[51] Int. Cl.$^5$ .................. C08J 9/14; C08G 18/08; C08G 18/06

[52] U.S. Cl. .................................................. 521/131

[58] Field of Search ........................................ 521/131

[56] References Cited

U.S. PATENT DOCUMENTS

| | | | |
|---|---|---|---|
| 3,091,551 | 5/1963 | Robertson | 521/131 |
| 3,471,416 | 10/1969 | Fijal | 521/131 |
| 3,887,502 | 6/1975 | Adams | 521/131 |
| 3,920,587 | 11/1975 | Watkinson | 521/131 |
| 4,177,332 | 12/1979 | Mitschke et al. | 521/131 |
| 4,299,924 | 11/1981 | Nomura et al. | 521/131 |
| 4,393,015 | 7/1983 | Kaneda et al. | 521/131 |
| 4,698,371 | 10/1987 | Werner et al. | 521/131 |
| 4,898,893 | 2/1990 | Ashida | 521/131 |
| 4,900,365 | 2/1990 | Lund et al. | 521/131 |
| 4,927,863 | 5/1990 | Bartlett et al. | 521/131 |
| 4,945,119 | 7/1990 | Smits et al. | 521/131 |

FOREIGN PATENT DOCUMENTS

| | | |
|---|---|---|
| 1135817 | 5/1989 | Japan . |
| 1225614 | 9/1989 | Japan . |
| 1229021 | 9/1989 | Japan . |
| 1234431 | 9/1989 | Japan . |
| 1268732 | 10/1989 | Japan . |

OTHER PUBLICATIONS

PCT application, WO 89/00594, publication date Jan. 26, 1989.

*Primary Examiner*—Maurice J. Welsh
*Assistant Examiner*—Rabon Sergent

[57] ABSTRACT

Closed-cell polyisocyanate-based foams are prepared using a blowing agent mixture containing an organic compound having a boiling point in excess of 65° C. in conjunction with another organic compound having a boiling point below about 40° C.

9 Claims, No Drawings

5,001,164

POLYURETHANE FOAM PREPARED WITH REDUCED LEVELS OF HARD HALOCARBON BLOWING AGENTS

BACKGROUND OF THE INVENTION

This invention relates to polyisocyanate-based foams, particularly to polyurethane or polyurethane-polyisocyanurate foams prepared using halocarbon blowing agents.

It is well known to prepare cellular materials by the reaction of polyisocyanates with active hydrogen-containing materials in the presence of a halocarbon blowing agent. In preparing flexible polyurethane foam, for example, halocarbons are often used to supplement water in generating a gas for blowing. However, the use of halocarbon blowing agents is particularly significant in making rigid foam. In rigid foam, the blowing agent provides thermal insulating properties as well as causes the foam to expand. For this reason, halocarbons usually constitute the major proportion of the blowing agent in rigid foam. Of the halocarbons, Refrigerants 11, 12 and 113 are of by far the most commercial importance, because of the combination of thermal insulating properties, boiling points and stability of these particular halocarbons.

Recently, the so-called "hard" halocarbons have been suspected of causing environmental damage in that it is thought the they might contribute to the destruction of atmospheric ozone. Accordingly, it is highly desirable to replace the hard halocarbons with other blowing agents which are not believed to cause environmental damage.

Unfortunately, the halocarbon blowing agents most commonly used in preparing polyisocyanate-based foam, and rigid foam in particular, are "hard" chlorofluorocarbons. "Hard" chlorofluorocarbons are those in which all hydrogen atoms of the corresponding alkane have been replaced with fluorine or chlorine. These halocarbons are particularly resistant to degradation in the environment, and therefore do not break down before reaching the atmospheric ozone layer, where they are believed to cause environmental damage. "Soft" halocarbons, which do contain one or more hydrogen atoms, more readily dissociate under conditions encountered in the atmosphere, and therefore less reaches the ozone layer of the atmosphere in a form which could cause significant damage.

Several "soft" CFCs exist which have boiling points similar to those of the most commonly used hard CFCs. However, the use of these "soft" CFCs has been limited due to their relatively high price and because the are not usually as efficient at blowing as the most common hard CFCs.

Several higher-boiling compounds are known which have very low conductivities, and would be considered as good candidates as blowing agents, except their use causes great dimensional instability in the foam. When the foam is at ambient temperatures, these high-boiling compounds condense, causing a partial vacuum in the cells, so the pressure of the surrounding atmosphere crushes the foam. Accordingly, these high-boiling CFCs have not been used in making polyurethane foam.

Because of the excellent thermal properties of certain of the high boiling CFCs, it would be desirable to take advantage thereof in preparing polymeric foam. Further, in view of the problems associated with the use of "hard" CFCs, it would be desirable to reduce or eliminate their use in making polyisocyanate-based foam.

SUMMARY OF THE INVENTION

In one aspect, this invention is a process for preparing a blown, closed-cell, polyisocyanate-based foam comprising reacting a polyisocyanate with an active hydrogen-containing material in the presence of a blowing agent, wherein the blowing agent comprises a mixture of:

(a) from about 40 to about 95 mole percent, based on components (a) and (b), of at least one organic compound having a boiling point less than or equal to about 40° C.

(b) from about 5 to about 60 mole percent, based on components (a) and (b), of at least one organic compound having a boiling point of at least about 65° C. but less than the maximum temperature encountered in the formation of the foam.

In another aspect, this invention is a blown, closed-cell, polyisocyanate-based foam prepared by the process of this invention.

In a third aspect, this invention is a blown, closed-cell polyisocyanate-based foam containing in its cells a mixture comprising:

(a) from about 40 to about 95 mole percent, based on components (a) and (b), of an organic compound having a boiling point less than or equal to about 40° C.

(b) from about 5 to about 60 mole percent, based on components (a) and (b), of an organic compound having a boiling point of at least about 65° C. but less than the maximum temperature encountered in the formation of the foam.

Surprisingly, this invention provides for the use of high-boiling blowing agents which previously were not considered suitable for preparing closed-cell foam, due to the higher temperatures required to vaporize same and their tendency to condense at ambient temperatures, causing shrinkage of the foam. Even more surprising is that the use of the blowing agent mixture of this invention provides a cellular polymer having excellent thermal and physical properties and good processing characteristics. In many instances, the blowing agent of this invention provides a cellular polymer having essentially equivalent properties as do foams made with conventional "hard" blowing agents.

A further advantage is that this invention permits the use of certain high boiling "soft" halocarbons which have excellent thermal conductivities. By substituting these halocarbons for the conventional hard CFCs, a substantial reduction or even elimination of hard CFC use can be obtained.

DETAILED DESCRIPTION OF THE INVENTION

In this invention, a particular blowing agent mixture is used to prepare a blown, closed-cell isocyanate-based foam. The blowing agent mixture contains as a first component one or more organic compounds having a boiling point less than about 40° C. As a second component, the blowing agent mixture contains at least one organic compound having a boiling point of at least 65° C., but not higher than the temperature encountered in the preparation of the isocyanate-based polymer. The first component comprises about 45 to about 95 percent of the total moles of the first and second components.

The first component preferably has a boiling point of at least about −30° C., more preferably at least about −20° C., most preferably at least about −15° C. and less than about 30° C., more preferably less than about 25° C. In addition, the first component advantageously has a thermal conductivity of less than about 20, preferably less than about 15, more preferably less than about 13, most preferably less than about 12 mW/M°K. The first component includes "hard" CFCs such Refrigerant 11, Refrigerant 12, Refrigerant 13, Refrigerant 14, Refrigerant 114, Refrigerant 115, Refrigerant 116, certain perhalogenated propanes, and the like. Of these, Refrigerant 11, Refrigerant 12 and are preferred, on the basis of superior performance, cost and availability.

Preferably, however, the first component is a "soft" CFC such as Refrigerant 21, Refrigerant 22, Refrigerant 123, Refrigerant 123a, Refrigerant 124, Refrigerant 124a, Refrigerant 125, Refrigerant 133 (all isomers), Refrigerant 134 and 134a, Refrigerant 141b, Refrigerant 142, Refrigerant 143, Refrigerant 151a, Refrigerant 152. Among these, Refrigerant 123 (all isomers), Refrigerant 141b and Refrigerant 142 (all isomers) are most preferred, as these most resemble the hard CFCs in properties and are more readily commercially available.

In addition to the CFCs, other low boiling compounds are also useful herein, including, for example, carbon dioxide, nitrogen, argon, pentane, and the like.

Mixtures of two or more of the foregoing CFCs are useful as the first component as well.

The second component advantageously has a boiling point less than about 150, more preferably less than about 110, more preferably less than about 100° C. The second component also advantageously has a thermal conductivity of less than about 20, preferably less than about 15, more preferably less than about 13, most preferably less than about 12 mW/M°K. Exemplary such materials include 1,1,1-trichloroethane, 1,1,2-trichloroethane, 1,1,2,2-tetrachloroethane, 1,1,1,2-tetrachloroethane, 1,1,1,2-tetrabromoethane, fluoropentachloroethane, 1-fluoro-1,2,2-trichloroethane, 1,2-difluoro-1,1,2,2-tetrachloroethane, 1,1-difluoro-1,2,2,2-tetrachloroethane, 1,2-dichloro-1-fluoroethane, 1,2-dichloroethane, 1,1-dibromoethane, 1 bromo-2-chloroethane, 2-chloropentane, 1,3-dichloropentane, 1,1,1,5-tetrachloropentane, cyclohexane, n-hexane, cis-1,2-dichloroethylene, tetrachloroethylene, and the like. The preferred second component materials include 1,1,1-trichloroethane, 1,1,2-trichloroethane, and cis-1,2-dichloroethylene as these materials have low flammability, low vapor thermal conductivity, and are readily commercially available. In addition, these materials have been found to provide foam having particularly good physical and thermal properties. Mixtures of two or more of the other members of that group are also useful.

As stated before, the first component comprises at least about 40 mole percent of the total moles of the first and second component of the mixture. Preferably, the first component comprises at least about 45, more preferably at least about 50 mole percent of the first and second components, up to about 90, more preferably up to about 80, most preferably up to about 70 mole percent of the first and second components.

Preferred mixtures of components (a) and (b) include mixtures of Refrigerant 11 and 1,1,1-trichloroethane, Refrigerant 12 and 1,1,1-trichloroethane. Particularly preferred mixtures are of Refrigerant 123 and 1,1,1-trichloroethane, Refrigerant 141b and 1,1,1-trichloroethane and Refrigerant 142 (all isomers) and 1,1,1-trichloroethane.

The mixture of this invention is useful in preparing cellular polymers, such as, for example, polyisocyanate-based foam. In preparing such polyisocyanate-based foam, a polyisocyanate is reacted with at least one active hydrogen-containing compound in the presence of the mixture of this invention. It is often convenient to preblend the mixture of this invention with the active hydrogen-containing compound before contacting same with the polyisocyanate. It is, however, possible to simultaneously blend the polyisocyanate, active hydrogen-containing compound and blowing agents simultaneously in the production of foam.

In making cellular polymers, it is advantageous to employ sufficient blowing agents to provide a polymer having a bulk density from about 20 to about 700, preferably about 25 to about 300, more preferably about 25 to about 150 kg/m$^3$.

Active hydrogen-containing compounds which are useful in the preparation of isocyanate-based cellular polymers include those materials having two or more groups which contain an active hydrogen atoms which react with an isocyanate, such as are described in U.S. Pat. No. 4,394,491, incorporated herein by reference. Preferred among such compounds are materials having at least two hydroxyl, primary or secondary amine, carboxylic acid, or thiol groups per molecule. Polyols, i.e. compounds having at least two hydroxyl groups per molecule, are especially preferred due to their desirable reactivity with polyisocyanates.

Suitable isocyanate reactive materials for preparing rigid polyurethanes include those having an equivalent weight of about 50 to about 700, preferably about 70 to about 300 and more preferably about 70–150. Such isocyanate-reactive materials also advantageously have a functionality of at least 2, preferably about 3, up to about 16, preferably up to about 8, active hydrogen atoms per molecule.

Suitable additional isocyanate-reactive materials include polyether polyols, polyester polyols, polyhydroxy-terminated acetal resins, hydroxyl-terminated amines and polyamines, and the like. Examples of these and other suitable isocyanate-reactive materials are described more fully in U.S. Pat. No. 4,394,491, particularly in columns 3–5 thereof. Most preferred for preparing rigid foams, on the basis of performance, availability and cost, is a polyol prepared by adding an alkylene oxide to an initiator having from about 2 to about 8, preferably about 3 to about 8 active hydrogen atoms. Exemplary such polyols include those commercially available under the trade names Voranol 202, Voranol 360, Voranol 370, Voranol 446, Voranol 490, Voranol 575, Voranol 800, all sold by The Dow Chemical Company, and Pluracol 824, sold by BASF Wyandotte. Other most preferred polyols include alkylene oxide derivatives of Mannich condensates, as taught, for example, in U.S. Pat. Nos. 3,297,597, 4,137,265 and 4,383,102, incorporated herein by reference, and aminoalkylpiperazine-initiated polyethers as described in U.S. Pat. Nos. 4,704,410 and 4,704,411, incorporated herein by reference.

Polyisocyanates useful in making polyurethanes include aromatic, aliphatic and cycloaliphatic polyisocyanates and combinations thereof. Representative of these types are diisocyanates such as m- or p-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate (and isomers), naphthylene- 1,5-diisocyanate, 1-methylphenyl-2,4-phenyldiisocyanate, diphenylmethane-4,4'-diisocyanate, diphenylmethane-2,4'-diisocyanate, 4,4'-biphenylenediisocyanate, 3,3'-dimethoxy-4,4'-biphenylenediisocyanate and 3,3'-dimethyldiphenylpropane-4,4'-diisocyanate; triisocyanates such as toluene-2,4,6-triisocyanate and polyisocyanates such as 4,4'-dimethyldiphenylmethane-2,2',5,5'-tetraisocyanate and the diverse polymethylenepolyphenylpolyisocyanates.

A crude polyisocyanate may also be used in the practice of this invention, such as the crude toluene diisocyanate obtained by the phosgenation of a mixture of toluene diamines or the crude diphenylmethane diisocyanate obtained by the phosgenation of crude diphenylmethanediamine. The preferred undistilled or crude polyisocyanates are disclosed in U.S. Pat. No. 3,215,652, incorporated by reference.

Especially preferred are methylene-bridged polyphenylpolyisocyanates, due to their ability to crosslink the polyurethane. The isocyanate index (ratio of equivalents of isocyanates to equivalents of active hydrogen-containing groups) is advantageously from about 0.9 to about 10, preferably about 1.0 to about 4.0, more preferably about 1.0 to about 1.5.

In addition to the foregoing critical components, it is often desirable to employ certain other ingredients in preparing cellular polymers. Among these additional ingredients are water, catalysts, surfactants, flame retardants, preservatives, colorants, antioxidants, reinforcing agents, fillers, and the like.

Water is often employed as an additional blowing agent and to provide processing and physical property advantages. When present, the water is preferably used in amounts not exceeding about 5, preferably about 4, more preferably about 3 parts by weight per 100 parts by weight active hydrogen-containing compound. Beneficial effects are seen when at least about 0.5, preferably at least about 1 part of water per 100 parts weight active hydrogen-containing compound is used.

Other auxiliaries useful in producing polyurethanes include surfactants, pigments, colorants, fullers, fibers, antioxidants, catalysts, flame retardants, stabilizers and the like. In making polyurethane foam, it is generally highly preferred to employ a minor amount of a surfactant to stabilize the foaming reaction mixture until it cures. Such surfactants advantageously comprise a liquid or solid organosilicone surfactant. Other, less preferred surfactants include polyethylene glycol ethers of long chain alcohols, tertiary amine or alkanolamine salts of long chain alkyl acid sulfate esters, alkyl sulfonic esters and alkyl arylsulfonic acids. Such surfactants are employed in amounts sufficient to stabilize the foaming reaction mixture against collapse and the formation of large, uneven cells. Typically, about 0.2 to about 5 parts of the surfactant per 100 parts by weight polyol are sufficient for this purpose.

One or more catalysts for the reaction of the polyol (and water, if present) with the polyisocyanate are advantageously used. Any suitable urethane catalyst may be used, including tertiary amine compounds and organometallic compounds. Exemplary tertiary amine compounds include triethylenediamine, n-methyl morpholine, pentamethyldiethylenetriamine, tetramethylethylenediamine, 1-methyl-4-dimethylaminoethylpiperazine, 3-methoxy-N-dimethylpropylamine, N-ethyl morpholine, diethylethanolamine, N-coco morpholine, N,N-dimethyl-N',N'-dimethyl isopropylpropylenediamine, N,N-diethyl-3-diethylaminopropylamine, dimethylbenzylamine and the like. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-2-ethyl hexanoate, as well as other organometallic compounds such as are disclosed in U.S. Pat. No. 2,846,408. A catalyst for the trimerization of polyisocyanates, such as an alkali metal alkoxide, may also optionally be employed herein. Such catalysts are used in an amount which measurably increases the rate of reaction of the polyisocyanate. Typical amounts are about 0.001 to about 1 parts of catalyst per 100 parts by weight of polyol.

In making a polyurethane foam, the polyol(s), polyisocyanate and other components are contacted, thoroughly mixed and permitted to expand and cure into a cellular polymer. The particular mixing apparatus is not critical, and various types of mixing head and spray apparatus are conveniently used. It is often convenient, but not necessary, to pre-blend certain of the raw materials prior to reacting the polyisocyanate and active hydrogen-containing components. For example, it is often useful to blend the polyol(s), blowing agent, surfactants, catalysts and other components except for polyisocyanates, and then contact this mixture with the polyisocyanate. Alternatively, all components can be introduced individually to the mixing zone where the polyisocyanate and polyol(s) are contacted. It is also possible to pre-react all or a portion of the polyol(s) with the polyisocyanate to form a prepolymer, although such is not preferred.

The polyurethane foam of this invention is useful in a wide range of applications, such as in spray insulation, appliance foam, rigid insulating boardstock, laminates, and many other types of rigid foam.

The following examples are given to illustrate the invention and are not intended to limit the scope thereof. Unless stated otherwise, all parts and percentages are given by weight.

EXAMPLE 1

A rigid polyurethane foam according to the invention (Sample No. 1) and a comparative foam (Comparative Sample A) are prepared from the formulations described in Table 1 following:

TABLE 1

| Component | Parts by Weight | |
|---|---|---|
| | Comp. Sample A* | Sample No. 1 |
| Polyol A [1] | 70 | 70 |
| Polyol B [2] | 10 | 10 |
| Polyol C [3] | 20 | 20 |
| Silicone Surfactant [4] | 1.5 | 1.5 |
| Pentamethyldiethylene diamine | 0.5 | 0.5 |
| Catalyst [5] | 1.0 | 1.0 |
| DMCHA [6] | 1.3 | 1.2 |
| Refrigerant 11 | 35.4 | 0 |
| Water | 3.0 | 3.0 |
| n-pentane | 0 | 9.6 |
| 1,1,1-trichloroethane | 0 | 17.6 |
| Polymeric MDI [7] | 125 | 125 |

TABLE 1-continued

| | Parts by Weight | |
|---|---|---|
| Component | Comp. Sample A* | Sample No. 1 |
| (index) | | |

*Not an example of this invention.
[1] A hexafunctional poly(propylene oxide) having a hydroxyl number of 480.
[2] An aminoethylpiperazine-initiated, trifunctional, 48-OH no. poly(propylene oxide).
[3] A 500 equivalent weight nominally difunctional poly(propylene oxide).
[4] Tegostab B8427, sold by T. H. Goldschmidt.
[5] 33% Potassium acetate solution.
[6] Dimethylcyclohexylamine.
[7] A 2.7 functional polymeric MDI.

The foams are prepared using a Zaco low pressure machine equipped with a Canon C7 mixing head fitted with a high shear mixer set to 600 rpm. The components are at a temperature of 25° C. prior to mixing. Height/weight measurements and density distribution are measured using a 200×4×6 cm mold preheated to 45° C., whereas post-demold expansion and density are measured using a 20×20×20 cm mold preheated to 25° C. The properties of the resulting foams are as indicated in Table 2 following.

TABLE 2

| | Sample No. | |
|---|---|---|
| Property | A* | 1 |
| Height/weight, cm/g | 1.28 | 1.23 |
| Density Distribution (10%) | 0.9 | 0.6 |
| Post Demold Expansion, mm | | |
| 3 minutes | 6.5 | 6.3 |
| 4 minutes | 4.9 | 4.2 |
| Density, kg/m$^3$ | 30.5 | 29.8 |
| k-factor, mW/M °K. | | |
| ∥ to rise | 21.0 | 23.0 |
| ⊥ to rise | 18.9 | 21.8 |

*Not an example of this invention.
[1] Expansion in millimeters, of a 20 × 20 × 20 cm cube after specified curing time.

As can be seen from the data in Table 1, excellent quality foam can be prepared according to this invention. In particular, it is noted that the height/weight measurement, demold properties and density are substantially unchanged compared to Comparative Sample A, and only a minor increase in k-factor is seen.

EXAMPLE 2

Polyurethane foam Sample Nos. 2-7 and Comparative Samples B, C and D are prepared according to the general procedure described in Example 1, using the formulations described in Table 3 following. Comparative Samples B, C and D are prepared using water and Refrigerant 11 as blowing agents. In Sample Nos. 2-7 varying proportions of the Refrigerant 11 are replaced with 1,1,1-trichloroethane. Properties of the resulting foam are as indicated in Table 4. As can be seen from the data in Table 4, good quality foam, having properties comparable to the Comparative Samples, are prepared using the blowing agent mixture of this invention.

TABLE 3

| | Parts by Weight | | | | | | | | |
|---|---|---|---|---|---|---|---|---|---|
| Component | Comp. Sample B* | Sample No. 2 | Sample No. 3 | Comp. Sample C* | Sample No. 4 | Sample No. 5 | Comp. Sample D* | Sample No. 6 | Sample No. 7 |
| Polyol A [1] | 70 | 70 | 70 | 70 | 70 | 70 | 70 | 70 | 70 |
| Polyol B [2] | 10 | 10 | 10 | 10 | 10 | 10 | 10 | 10 | 10 |
| Polyol C [3] | 20 | 20 | 20 | 20 | 20 | 20 | 20 | 20 | 20 |
| Silicone Surfactant [4] | 1.5 | 1.5 | 1.5 | 1.5 | 1.5 | 1.5 | 1.5 | 1.5 | 1.5 |
| PMDETA [5] | 0.7 | 0.7 | 0.7 | 0.7 | 0.7 | 0.7 | 0.7 | 0.7 | 0.7 |
| Catalyst [6] | 1.0 | 1.0 | 1.0 | 1.0 | 1.0 | 1.0 | 1.0 | 1.0 | 1.0 |
| DMCHA [7] | 1.33 | 1.28 | 1.40 | 1.15 | 1.20 | 1.30 | 1.0 | 1.0 | 1.0 |
| Refrigerant 11 | 41.1 | 30.8 | 21.0 | 33.0 | 25.0 | 16.5 | 25.8 | 20.0 | 13.0 |
| Water | 1.5 | 1.5 | 1.5 | 3.0 | 3.0 | 3.0 | 4.5 | 4.5 | 4.5 |
| 1,1,1-trichloroethane | 0 | 10.0 | 21.0 | 0 | 8.0 | 17.0 | 0 | 6.5 | 13.0 |
| Polymeric MDI [8] (index) | 125 | 125 | 125 | 125 | 125 | 125 | 125 | 125 | 125 |

*Not an example of this invention.
[1] [2] [3] [4] [6] [7] [8] Same as corresponding notes in Table 1.
[5] Pentamethyldiethylenetriamine.

TABLE 4

| | Sample or Comparative Sample No. | | | | | | | | |
|---|---|---|---|---|---|---|---|---|---|
| Property | Comp. Sample B* | Sample No. 2 | Sample No. 3 | Comp. Sample C* | Sample No. 4 | Sample No. 5 | Comp. Sample D* | Sample No. 6 | Sample No. 7 |
| Cream/Gel/Tack Free Times, sec | 7/50/72 | 8/52/75 | 7/48/70 | 6/48/68 | 6/47/72 | 6/50/78 | 8/38/52 | 6/39/59 | 6/40/55 |
| Free Rise Density [1] | 22.6 | 22.9 | 23.0 | 23.0 | 23.4 | 23.5 | 21.0 | 22.9 | 22.0 |
| Height/Weight, cm/g | 1.146 | 1.142 | 1.114 | 1.209 | 1.186 | 1.136 | 1.148 | 1.097 | 1.155 |
| Density Distribution [4] | 0.89 | 1.30 | 0.67 | 0.77 | 0.70 | 0.49 | 1.86 | 1.193 | 0.82 |
| Post Demold Expansion, mm [2] | | | | | | | | | |
| 3 min | 7.8 | 8.3 | 10.2 | 7.8 | 7.8 | 10.0 | 7.3 | 8.0 | 6.2 |
| 4 min | 6.5 | 5.9 | 7.1 | 5.6 | 5.3 | 9.9 | 5.4 | 6.2 | 4.7 |
| k-factor, mW/M °K. | | | | | | | | | |
| ∥ to rise | 19.3 | 20.0 | N.D. | 21.2 | 20.8 | 22.1 | 21.4 | N.D. | 22.3 |
| ⊥ to rise | 17.7 | 17.7 | 19.3 | 18.8 | 19.0 | 19.5 | 19.9 | 20.0 | 20.5 |

TABLE 4-continued

| Property | Comp. Sample B* | Sample No. 2 | Sample No. 3 | Comp. Sample C* | Sample No. 4 | Sample No. 5 | Comp. Sample D* | Sample No. 6 | Sample No. 7 |
|---|---|---|---|---|---|---|---|---|---|
| Dimensional Stability [3] | 0 | −0.1 | −5.0 | −0.4 | −0.7 | −0.7 | −0.5 | −0.8 | −0.4 |

*Not an example of this invention.
[1] Kg/m$^3$
[2] Expansion in millimeters, of a 20 × 20 × 20 cm cube after specified curing time.
[3] Volume change after 24 hours (−30° C.) of a 5 × 5 × % cm cube, expressed relative to the final volume of Comparative Sample B.
[4] A statistical measure of the uniformity of density of a sample. The reported value is the standard deviation of the density of the foam.

EXAMPLE 3

A mixture of 80 mole percent Refrigerant 11 and 20 mole percent hexane is used to prepare a rigid polyurethane foam using a methyldiethanolamine-modified formulation as described in U.S. Pat. No. 4,632,943. The resulting foam has a density of 1.71 pounds per cubic foot, whereas a similar foam made using an equivalent amount, on a molar basis, of Refrigerant 11 as the sole blowing agent, has a density of 1.85 pounds per cubic foot.

EXAMPLE 4

Following the general procedure set out in Example 1, polyurethane foam Sample Nos. 8 to 11 and Comparative Samples E and F are prepared from the formulation described in Table 5. The resulting foams have properties as reported in Table 5. As can be seen from the data in Table 5, foams having excellent properties are obtained.

TABLE 5

| Component | Comp. Samp. E* | Samp. No. 8 | Samp. No. 9 | Comp. Samp. F* | Samp. No. 10 | Samp. No. 11 |
|---|---|---|---|---|---|---|
| Formulated Polyol [1] | 100 | 100 | 100 | 100 | 100 | 100 |
| Water | 1.8 | 1.8 | 1.8 | 1.8 | 1.8 | 1.8 |
| Refrigerant 11 | 37.8 | 16.6 | 0 | 0 | 0 | 17.28 |
| Refrigerant 142B | 0 | 2.5 | 10.9 | 0 | 0 | 10.9 |
| Refrigerant 123 | 0 | 0 | 0 | 43.1 | 33.84 | 14.85 |
| α-trichloroethane | 0 | 16.5 | 19.2 | 0 | 7.84 | 7.59 |
| Polymeric MDI [2] | 146 | 146 | 146 | 140.5 | 140.5 | 140.5 |
| Properties | | | | | | |
| Cream/Gel/TFT, sec | 7/57/73 | 7/63/75 | 2/54/67 | 10/69/92 | 6/62/82 | 6/56/80 |
| Free Rise Density | 21.1 | 22.2 | 21.4 | 22.2 | 21.9 | 21.9 |
| Height/Weight, M/g | 1.24 | 1.13 | 1.12 | N.D. | N.D. | N.D. |
| k-factor, ‖ to rise, mW/m °K. | 20.0 | 22.5 | 23.5 | 21.0 | 21.1 | 19.7 |
| k-factor, ⊥ to rise mW/m °K. | 18.1 | 19.5 | 20.6 | 20.6 | 20.6 | 19.3 |
| Compressive Strength, KPa | | | | | | |
| ‖ to rise | 93 | 87 | 86 | 100 | 97 | 115 |
| ⊥ to rise | 46 | 40 | 25 | 82 | 67 | 97 |

*Not an example of this invention.
[1] A polyol blend including surfactants and catalysts, having an average hydroxyl number of 460, commercially available as Voranol RST 461 polyol, sold by The Dow Chemical Company.
[2] A 2.7 functional polymeric MDI.

What is claimed is:

1. A process for preparing a blown, closed-cell, polyisocyanate-based foam comprising reacting a polyisocyanate with an active hydrogen containing material in the presence of blowing agent, wherein the blowing agent comprises a mixture of:
   (a) from about 40 to about 95 mole percent, based on the weight of components (a) and (b) of an organic compound having a boiling point from about −30° C. to about 40° C.,
   (b) from about 5 to about 60 mole percent, based on the weight of components (a) and (b) of an organic compound having a boiling point of from at least 65° C. but less than the maximum temperature encountered in the formation of the foam, and
   (c) water in from about 0.5 to about 5.0 parts by weight per 100 parts by weight active hydrogen containing material, and wherein component (a) and component (b) are each a halocarbon.

2. The process of claim 1 wherein component (a) and component (b) each have a gas thermal conductivity of less than about 15 mW/M°K at 25° C.

3. The process of claim 2 wherein component (a) and component (b) each have a gas thermal conductivity of less than about 13 mW/M°K at 25° C.

4. The process of claim 1 wherein component (a) is a chlorofluorocarbon.

5. The process of claim 4 wherein component (b) is a chlorine-substituted methane or ethane.

6. The process of claim 5 wherein component (a) is a soft CFC.

7. The process of claim 6 wherein component (b) is 1,1,1-trichloroethane, 1,1,2-trichloroethylene, 1,2-ethyldichloride, 1,1,2-trichloroethane or 1,1-ethyldichloride.

8. A blown, closed-cell, polyisocyanate-based foam prepared by reacting a polyisocyanate with an active hydrogen containing material in the presence of a blowing agent, wherein the blowing agent comprises a mixture of:
   (a) from about 40 to about 95 mole percent, based on the weight of components (a) and (b) of an organic compound having a boiling point from about −30° C. to about 40° C., (b) from about 5 to about 60 mole percent based on the weight of components (a) and (b) of an organic compound having a boiling point of at least about 65° C. but less than the maximum temperature encountered in the formation of the foam, and (c) water in from about 0.5 to about 5.0 parts by weight per 100 parts by weight active hydrogen containing material.

9. A blown closed-celled polyisocyanate-based foam containing in its cells a gaseous mixture comprising:

(a) from about 40 to about 95 mole percent, based on the weight of components (a) and (b) of an organic compound having a boiling point from about −30° C. to about 40° C., and (b) from about 5 to about 60 mole percent, based on the weight of components (a) and (b) of an organic compound having a boiling point of from at least 65° C. but less than the maximum temperature encountered in the formation of the foam and wherein component (a) and (b) are each a halocarbon.

* * * * *